A. E. TAVA.
COFFEE ROASTER.
APPLICATION FILED JAN. 7, 1910.
955,616.
Patented Apr. 19, 1910.
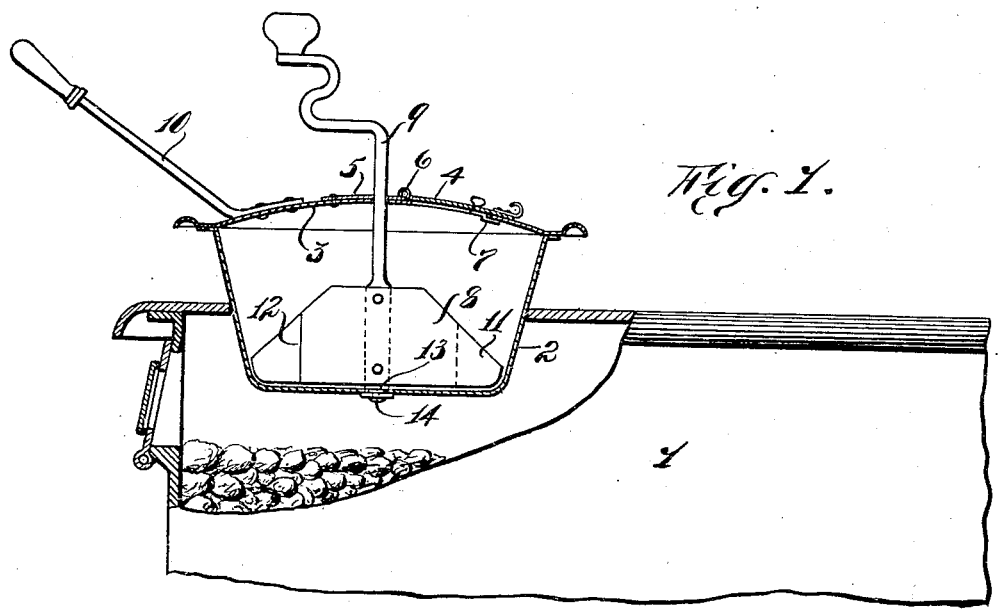
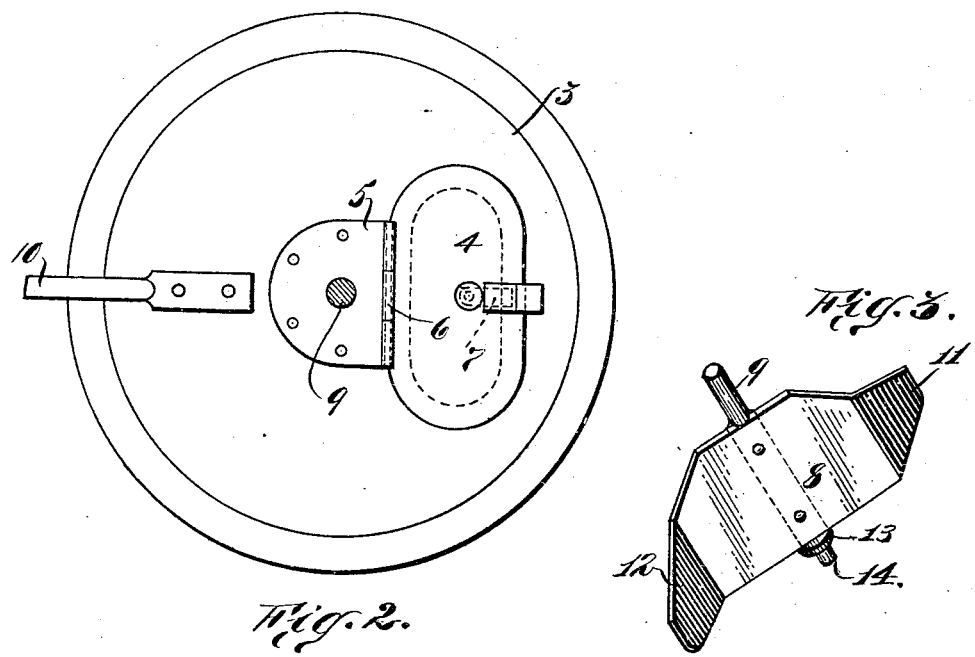
Witnesses:
C. A. Jarvis
Benjamin Osenbrug.
Inventor
Albano E. Tava
by Chrystie and Wright
attorneys.

UNITED STATES PATENT OFFICE.

ALBANO E. TAVA, OF NEW YORK, N. Y.

COFFEE-ROASTER.

955,616. Specification of Letters Patent. Patented Apr. 19, 1910.

Application filed January 7, 1910. Serial No. 536,827.

*To all whom it may concern:*

Be it known that I, ALBANO E. TAVA, a subject of the Emperor of Austria-Hungary, residing at New York city, in the borough of Manhattan, county and State of New York, have invented certain new and useful Improvements in Coffee-Roasters, of which the following is a clear, full, and exact description.
The object of this invention is to provide an improved portable coffee roaster for use with the ordinary stove or range, to enable a better, more uniform and thorough roasting of each and every berry that is to be roasted.

One object of the invention is to provide means whereby the coffee which is being directly acted upon by the heat is brought into close and intimate relation to the source of heat, and that the coffee will be continuously stirred and uniformly changed in its position.

A further object is to provide an improved stirring or mixing blade or paddle, which comes into contact with and uniformly moves the berries in the roasting vessel, produces a continuous even motion to the same, whereby substantially the same quantities of berries will be moved at each point of the bottom of the receptacle, no matter how far their radial position is from the center of the blade.

In carrying out my invention, various details of construction and arrangement of parts may be adopted. I have however, shown my preferred form of roaster in this application.

The scope of my invention will be pointed out in the claims.
In the accompanying drawings, Figure 1 is a sectional central side elevation of my improved coffee roaster. Fig. 2 is a plan view of Fig. 1 with a part of the handles broken away. Fig. 3 is a perspective view of my improved stirrer.

In carrying out my invention, I make use of a vessel 2 having sloping sides adapted to permit the roaster to be inserted down below the level of the ordinary cook stove top 1 through one of the removable plate holes in the same, so that the coffee in contact with the bottom of the receptacle and surrounding the paddle or mixer can be at all times maintained at an even heat within the stove. To the top of the vessel 2 there is permanently secured a cover 3 provided with a handle 10 riveted thereto, for the purpose of removing and handling the roaster as a whole. In a foot-step bearing 14 I mount a spindle 9 having the crank handle preferably of the shape shown in Fig. 1. The crank handle has its second bearing in the cover 3. To insure a better bearing surface for the spindle 9 I rivet a second plate 5 to the cover 3, through which the spindle projects, and I use one edge of this reinforcing plate 5 to provide a hinge 6 for a closing plate 4 for an aperture shown in dotted lines Fig. 2 through which the berries are inserted and ejected. A latch 7 of ordinary construction serves to hold the cover plate 4 tightly in place so as to keep the aroma within the receptacle.

The paddle or blade 8 is imperforate and is provided with a central section of a given height with two side wings 11 and 12 extending therefrom of less height than the central part, and is so shaped as to conform substantially with the contour of the bottom and the lower corners of the vessel, while the sides of the stirrer are inclined to meet with the upper part of the paddle at the point of greatest height.

It will be obvious that the paddle moves with greater rapidity at its free or outer ends where there is less surface to the same, and that consequently the berries, while moved more rapidly at the outer end, will be moved in lesser quantity than they are moved near the axis of the spindle, but that at the axis greater quantities will be continually moved and caused to flow over the top of the blade. The reversely turned ends 11 and 12 aid in causing the berries to flow over the same. I am thus enabled to secure a substantially even roasting of all the berries in the kettle.

I am aware that heretofore it has been proposed to form coffee roasters of the same general construction as the invention herein shown, and I do not claim such general construction. What is essential to my invention however, is that the blade be reversely turned at its ends, fit the bottom and the corners of the vessel, and slope gradually to near the axis of the same, whereby substantially the same quantity of berries will be displaced at the axis as is displaced at the ends of the blades, thus preventing burning of the berries at the center and the under-roasting thereof at the ends.

I claim as my invention:

1. The herein described coffee roaster, comprising a vessel having inclined sides, an imperforate stirring paddle therein fitting the contour of the bottom and corners of the vessel, having reversely turned end sections, a central section of greater height, inclined sides meeting the central section at a distance from the center, the inclination being of such a pitch that substantially the same quantity of berries will be moved throughout the entire length of the paddle both near the center, and at the ends, a spindle secured to the center of said blade, a cover for the vessel, a foot-step bearing in the receptacle and a bearing in the cover for the spindle, and a crank arm for manual rotation of the spindle.

2. The herein described coffee roaster, comprising a vessel having an imperforate stirring paddle therein fitting the contour of the bottom and corners of the vessel, having reversely turned end sections, a central section of greater height, inclined sides meeting the central section at a distance from the center, the inclination being of such a pitch that substantially the same quantity of berries will be moved throughout the entire length of the paddle both near the center, and at the ends, a spindle secured to the center of said blade, a cover for the vessel, a foot-step bearing in the receptacle and a bearing in the cover for the spindle, and a crank arm for manual rotation of the spindle.

Signed at New York city, N. Y., this 30th day of December 1909.

ALBANO E. TAVA.

Witnesses:
  JOHN J. FRESCHI,
  JOSEPH M. TORRISI.